(12) United States Patent
Chiou et al.

(10) Patent No.: US 7,685,478 B2
(45) Date of Patent: *Mar. 23, 2010

(54) METHOD OF TESTING MEMORY CARD OPERATION

(75) Inventors: Alan Chiou, Mountain View, CA (US); Bahman Qawami, San Jose, CA (US); Farshid Sabet-sharghi, Los Altos Hills, CA (US)

(73) Assignee: SanDisk Corporation, Milpitas, CA (US)

( * ) Notice: Subject to any disclaimer, the term of this patent is extended or adjusted under 35 U.S.C. 154(b) by 349 days.

This patent is subject to a terminal disclaimer.

(21) Appl. No.: 11/693,644

(22) Filed: Mar. 29, 2007

(65) Prior Publication Data

US 2008/0244143 A1 Oct. 2, 2008

(51) Int. Cl.
*G01R 31/28* (2006.01)
(52) U.S. Cl. .................................................. 714/712
(58) Field of Classification Search ................. 714/724, 714/718, 799, 712, 46; 702/108, 117; 455/423, 455/426.1
See application file for complete search history.

(56) References Cited

U.S. PATENT DOCUMENTS 7,225,357 B2 * 5/2007 Tai et al. ....................... 714/25

OTHER PUBLICATIONS

U.S. Appl. No. 11/693,648, filed Mar. 29, 2007.
Office Action dated Apr. 30, 2009 in U.S. Appl. No. 11/693,648.
Response to Office Action dated Jul. 30, 2009 in U.S. Appl. No. 11/693,648.
Notice of Allowance and Fee(s) Due dated Oct. 16, 2009 in U.S. Appl. No. 11/693,648.

* cited by examiner

*Primary Examiner*—Phung M Chung
(74) *Attorney, Agent, or Firm*—Vierra Magen Marcus & DeNiro LLP

(57) ABSTRACT

A system and method are disclosed for testing operation of a memory card within an electronic host device. The system includes a flat flexible cable, or strip, for electrically coupling between the memory card slot in a host device and a test assembly. The test assembly may have a card slot for accepting an external memory card, and a debug header for receiving a cable connected to a debug apparatus such as a logic analyzer and/or an oscilloscope.

22 Claims, 5 Drawing Sheets

METHOD OF TESTING MEMORY CARD OPERATION

CROSS-REFERENCE TO RELATED APPLICATIONS

The following application is cross-referenced and incorporated by reference herein in its entirety:

U.S. patent application Ser. No. 11/693,648, entitled "EXTENDER STRIP AND TEST ASSEMBLY FOR TESTING MEMORY CARD OPERATION," by Alan Chiou et al., filed concurrently herewith.

BACKGROUND OF THE INVENTION

1. Field of the Invention

Embodiments of the present invention relate to a system and method of testing operation of a memory card with an electronic host device.

2. Description of the Related Art

The strong growth in demand for portable consumer electronics is driving the need for high-capacity storage devices. Non-volatile semiconductor memory devices, such as flash memory storage cards, are becoming widely used to meet the ever-growing demands on digital information storage and exchange. Their portability, versatility and rugged design, along with their high reliability and large capacity, have made such memory devices ideal for use in a wide variety of electronic devices, including for example digital cameras, digital music players, video game consoles, PDAs and cellular telephones.

There is an ever-present push to provide greater device capability in a smaller form factor. As a result, some devices have had to resort to positioning the memory card slot somewhere within the interior of the device. For example, as shown in prior art FIG. 1, in order to provide the most compact form factor, some cellular telephone manufacturers have resorted to providing a telephone 20 having a memory card slot 22 positioned beneath a cover 24. It is also known in cellular telephones and other electronic devices to position the memory card slot 22 beneath the battery slot. Thus, both the cover and battery must be removed to allow access to the memory card slot 22. Still other electronic devices have the memory card slot positioned elsewhere within the interior of the device so as to be generally inaccessible when the device is assembled and operational.

One drawback to having the memory card slot positioned within the interior of the device is that it is not accessible to test equipment used to test the operation of the memory card, electronic device and/or the exchange of signals therebetween. In particular, prior to a device manufacturer shipping a line of electronic devices, the manufacturer will typically perform fault testing on one or more of the devices. This fault test may include transferring data between the portable memory card positioned within the card slot 22 and the electronic device to ensure proper data transfer. The testing equipment may include a debugging apparatus, such as a logic analyzer and/or an oscilloscope, so that, when a problem is detected, the fault may be debugged and the specific source of the problem identified.

Such testing operations are carried out by connecting to the signal contact pads in the memory card slot of the host device and testing the device during its normal operation. However, with designs where the memory card slot is enclosed within the housing, for example buried beneath the battery and/or cover, it is not possible to access the memory card slot in order to perform the fault testing.

SUMMARY OF THE INVENTION

The present invention, roughly described, relates to a system and method for testing operation of a memory card with an electronic host device. The present system is particularly useful for testing a host device having a memory card slot buried beneath a cover and possibly one or more other host device components when the host device is operational. The system includes a flat flexible cable, or strip, for electrically coupling between the memory card slot in a host device and a test assembly. An end of the strip may include contact pads for mating with the contact pads within the host device card slot. The same end may further include a rigid member for ensuring proper alignment and contact between the strip contact pads and the card slot contact pads. In embodiments, the rigid member may be the same size and shape as a memory card for which the host device memory card slot is configured.

The opposite end of the strip may be connected to the test assembly. The test assembly may have a card slot of accepting an external memory card, and a debug header for receiving a cable connected to a debug apparatus such as a logic analyzer and/or an oscilloscope. In embodiments, the external card slot on the test assembly may be configured to accept the same or different type of memory card as the host device card slot.

In operation, once all components are connected, signals may be exchanged between the host device and the external memory card plugged into the test assembly. The debug header may extract signals sent from the host device to the external memory card. Those signals may be transferred to the debugging apparatus, which can then analyze the integrity of the respective signals. Thus, according to the present invention, the operation of a memory card with the host device, and the exchange of signals between the host device and a memory card, may be tested and debugged even though the memory card slot is inaccessible while the host device is operational.

DETAILED DESCRIPTION

Embodiments will now be described with reference to FIGS. 2 through 8, which relate to a system and method of testing operation of a memory card with an electronic host device. It is understood that the present invention may be embodied in many different forms and should not be construed as being limited to the embodiments set forth herein. Rather, these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

Figure 2:
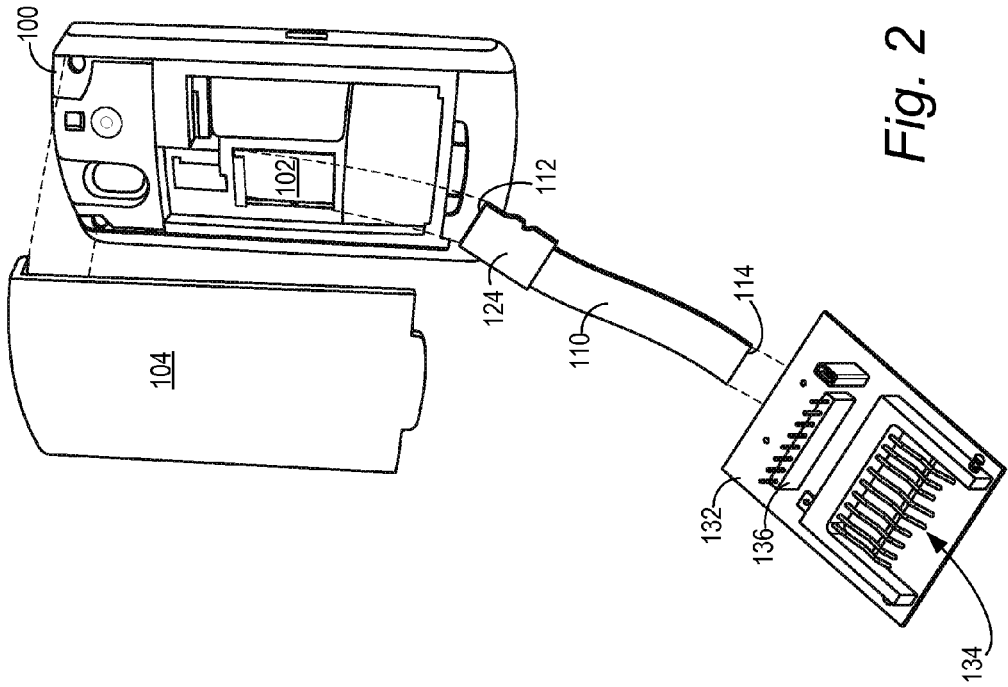
FIG. 2 is a perspective view of an electronic device together with a strip and test assembly according to the present invention.
Figure 1:
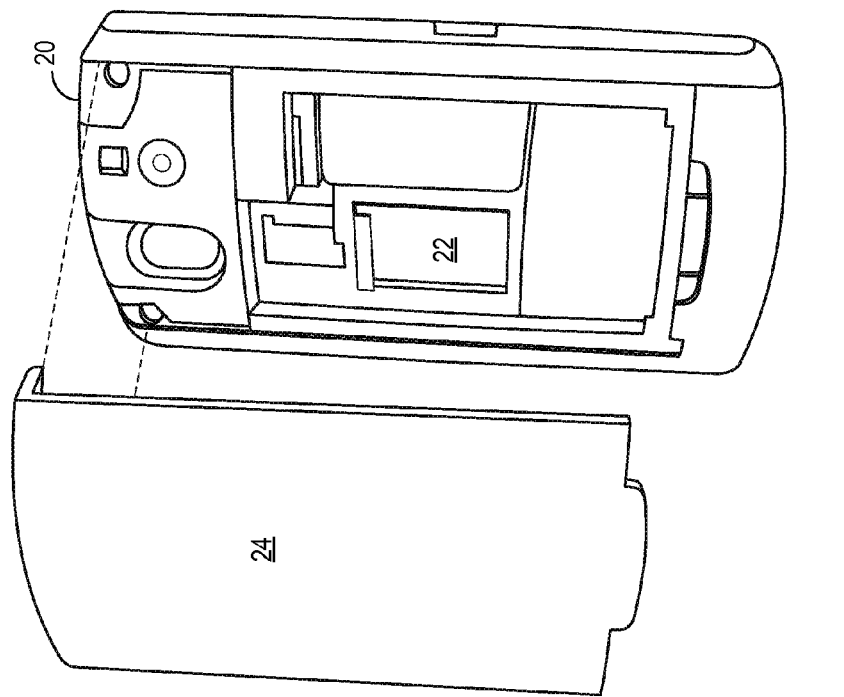
FIG. 1 is a perspective view of a conventional electronic device having a memory card slot buried beneath the device cover and possibly one or more additional components.

Referring initially to the exploded perspective view of FIG. 2, there is shown an electronic device 100 including a memory card slot 102 provided within the interior of device 100. Device 100 may be any of a variety of electronic devices including a slot for receiving a memory card. Such devices include, but are not limited to, cellular telephones, digital cameras, digital music players, video game consoles, PDAs, and handheld computers. Card slot 102 may be of a type to receive any of a variety of known memory card configurations, such as for example a micro SD memory card, manufactured by San Disc Corporation, Milpitas, Calif. Card slot 102 may be accessible upon removal of a cover 104. It is contemplated that card slot 102 may be buried beneath one or more additional components of host device 100, such as for example a battery powering device 100.

Figure 3:
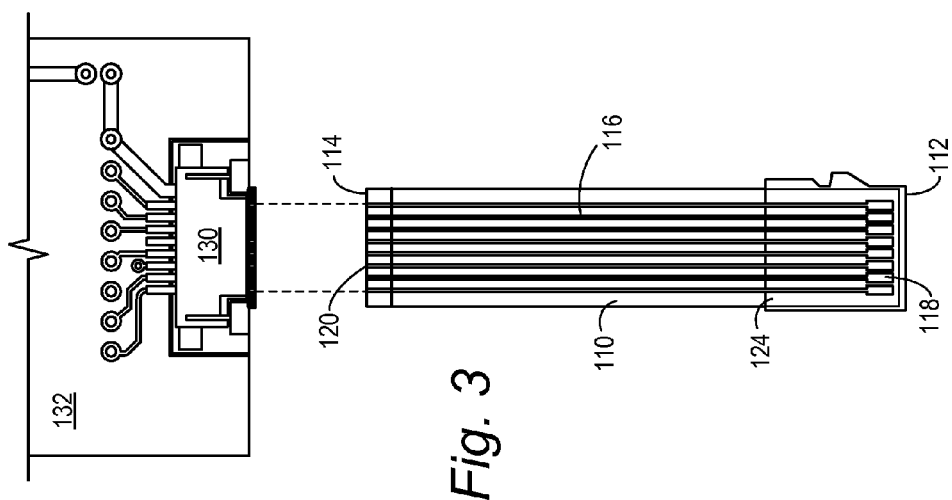
FIG. 3 is a bottom view of the strip and a portion of the test assembly according to the present invention.

Referring now to the perspective view of FIG. 2 and the bottom view of FIG. 3, a flexible electrical connector, or strip, 110 may be provided in accordance with the present invention having a first end 112 and a second end 114 opposite end 112. Flexible strip 110 may be flat flexible cable (FFC), and may include a plurality of electrical traces 116 laminated within an insulator such as for example polyester. It is understood that the insulator may be other than polyester in alternative embodiments of the present invention. The number of traces laminated within electrical strip 110 may match the number of contact pads within card slot 102. It is understood that the number of traces within strip 110 may be less than or greater than the number of contact pads in card slot 102 in alternative embodiments. The flexible strip 110 may have a width of for example be one-third of an inch to two-thirds of an inch and may include electrical traces having a pitch of 0.5 millimeters. The width of strip 110 may be less than one-third inches and greater than two-thirds inches, and the pitch may be less than or greater than 0.5 millimeters, in alternative embodiments. Flexible strip 110 may have a substantially flat profile so as to be able to extend from the interior of device 100 to the exterior of device 100 when the device is fully assembled with cover 104 affixed in position on device 100.

End 112 of strip 110 may include exposed electrical contact pads 118 for mating with the contact pads within card slot 102. Similarly, end 114 may include exposed electrical contact pads 120 for mating with connector pins in a testing apparatus as explained hereinafter.

First end 112 may further include a rigid member 124 mounted to strip 110 on a side of strip 110 opposite that including exposed contact pads 118. Rigid member 124 may be mounted using a known adhesive, have for example low outgassing and wear properties over time. Rigid member 124 is sized to fit within card slot 102 and is provided to facilitate contact between contact pads 118 on strip 110 and the contact pads within card slot 102.

In an embodiment, rigid member 124 may have the same footprint and shape as the memory card for which card slot 102 is configured. Thus, where card slot 102 accepts a micro SD card, rigid member 124 may have the outline of a micro SD card (as shown for example in FIG. 3). It is understood that rigid member 124 may have other shapes in alternative embodiments, with the provision that rigid member 124 ensure a proper alignment and contact of contact pads 118 with the contact pads within the card slot 102. Rigid member 124 may be formed of any of various rigid, electrically insulative materials, such as for example polycarbonate and other plastics. In an alternative embodiment, it is possible that rigid member 124 may be formed of metal or another conductor, where the adhesive used to affix rigid member 124 to strip 110 is an electrical isolator.

The length of strip 110 (the distance between end 112 and end 114) may vary in alternative embodiments of the present invention, and may for example be between a half inch and four inches, and in further embodiments be between one and two inches. It is understood that the length of strip 110 may be shorter than one half inch and longer than four inches in further embodiments of the present invention.

End 114 of strip 110 may mate with a connector 130 in a testing assembly 132. Such connectors are commercially available for example from Molex Corp. having headquarters in Lisle, Ill. Test assembly 132 includes an external card slot 134 for receiving an external memory card as explained hereinafter. Test assembly 132 includes a debug header 136 connecting the test assembly 132 to a debugging apparatus, such as for example a logic analyzer or an oscilloscope (not shown) as are known in the art. End 114 of strip 110 may be a ZIF (zero insertion force) connector for mating within connector 130. Connector 130 connects the signal traces within strip 110 both to respective contact pads within external card slot 134, and with electrical terminals of debug header 136.

Figure 4:
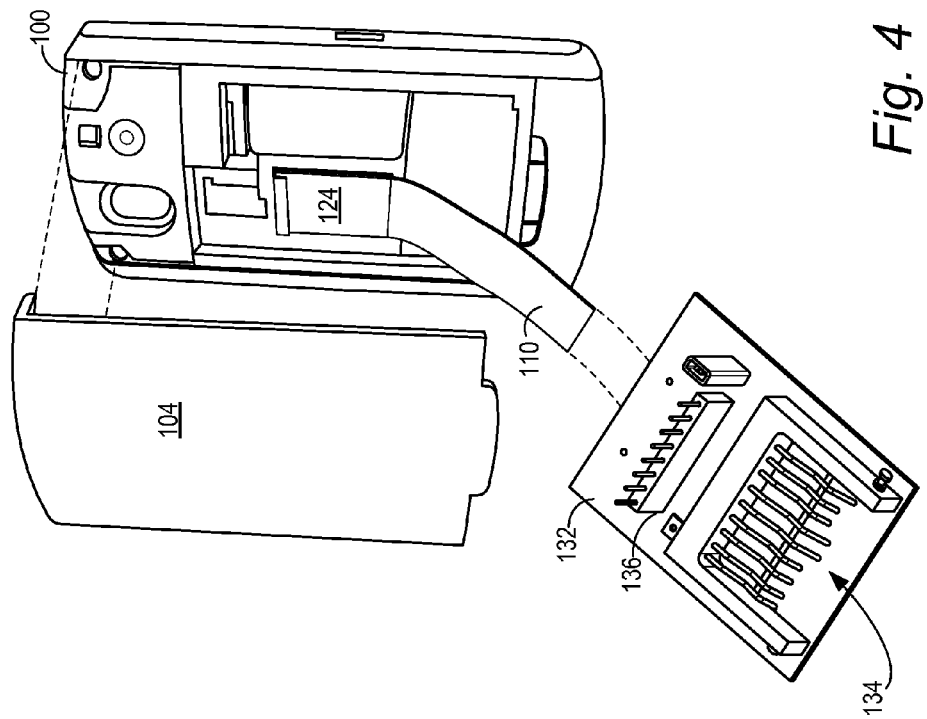
FIG. 4 is a perspective view of a strip according to the present invention having an end affixed within the memory card slot of the electronic device.

Referring now to FIG. 4, the rigid member 124 affixed to strip 110 may be inserted into card 102 in host device 100. Member 124 ensures proper alignment and contact between contact pins 118 in strip 110 and the contact pads within the slot 102 of host device 100. It is understood that rigid member 124 may be omitted in alternative embodiments and other mechanisms be provided (as part of strip 110 and/or within slot 102) to ensure proper alignment and contact of contact pins 118 with the contact pads within the card slot 102. When end 112 of strip 110 is connected within card slot 102, and end 114 of strip 110 is connected to the test assembly 132, the electrical traces 116 within strip 110 communicate electrical signals between the host device and the test assembly.

Figure 5:
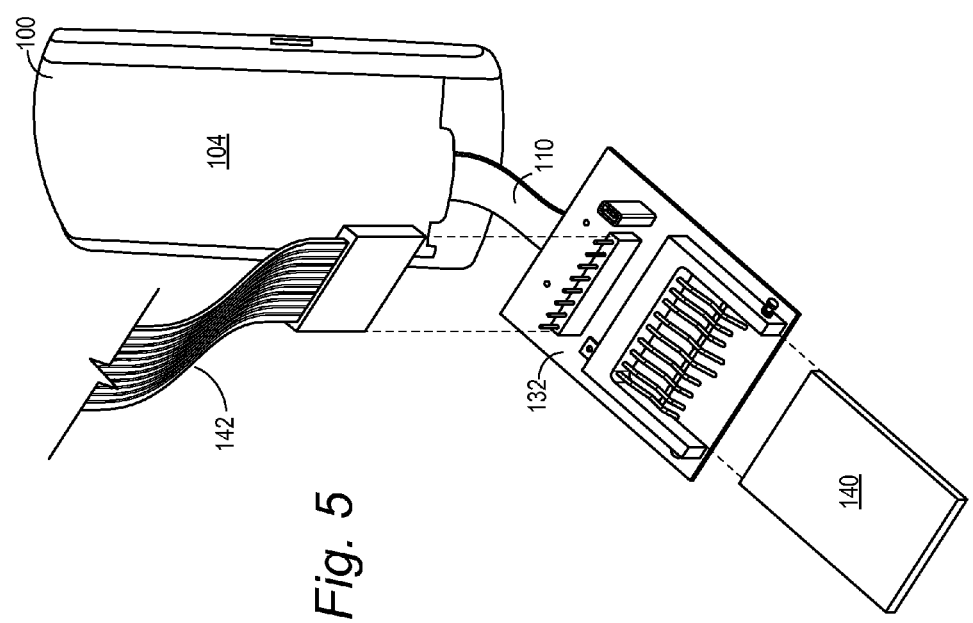
FIG. 5 is a perspective view of a first end of a strip according to the present invention affixed within a sealed electronic device and a second end of the strip affixed to a test assembly.
Figure 6:
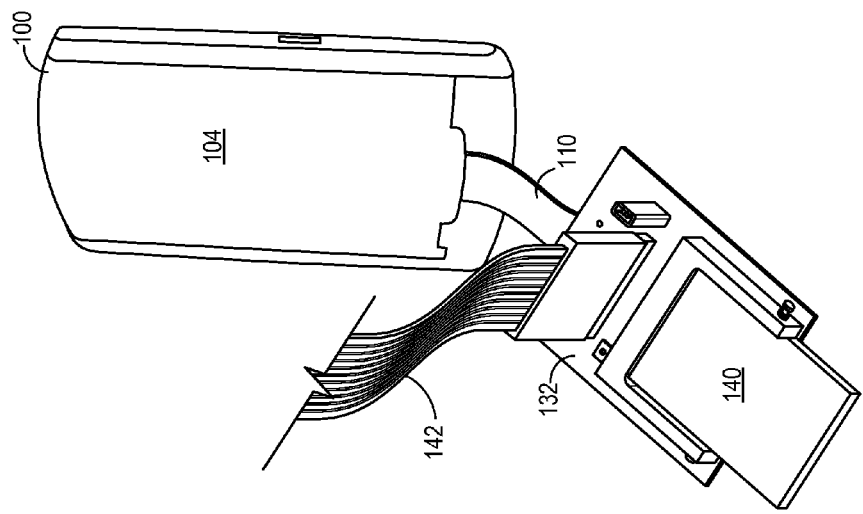
FIG. 6 is a perspective view as in FIG. 5, with an external memory card and debug apparatus cable affixed to the test assembly.

Referring now to the perspective views of FIGS. 5 and 6, once the end 112 of strip 110 is mated within slot 102, the cover 104 as well as a battery or any other components may be assembled onto the host device to enable operation of the host device 100. As strip 110 is flat and flexible, it can bend as necessary so that end 112 remains seated within slot 102 while opposite end 114 extends outside of the sealed host device 100.

As is also shown in the perspective views of FIGS. 5 and 6, external card slot 134 of test assembly 132 may receive an external memory card 140, and debug header 136 may accept a cable 142 connecting test assembly 132 with one or more debug devices such as a logic analyzer and/or an oscilloscope.

Memory card 140 may be the same type of memory card that is accepted within slot 102 within host device 100. In alternative embodiments, external memory card 140 may be different than the memory card accepted within card slot 102 in device 100. Thus for example where slot 102 is configured to receive a micro SD card, slot 134 may be configured to receive a mini SD card, an SD card or a variety of other memory cards. Additionally, slot 134 may accept an adapter which would allow a single slot 134 to operate with any of a variety of different configurations of external memory card 140.

Figure 7:
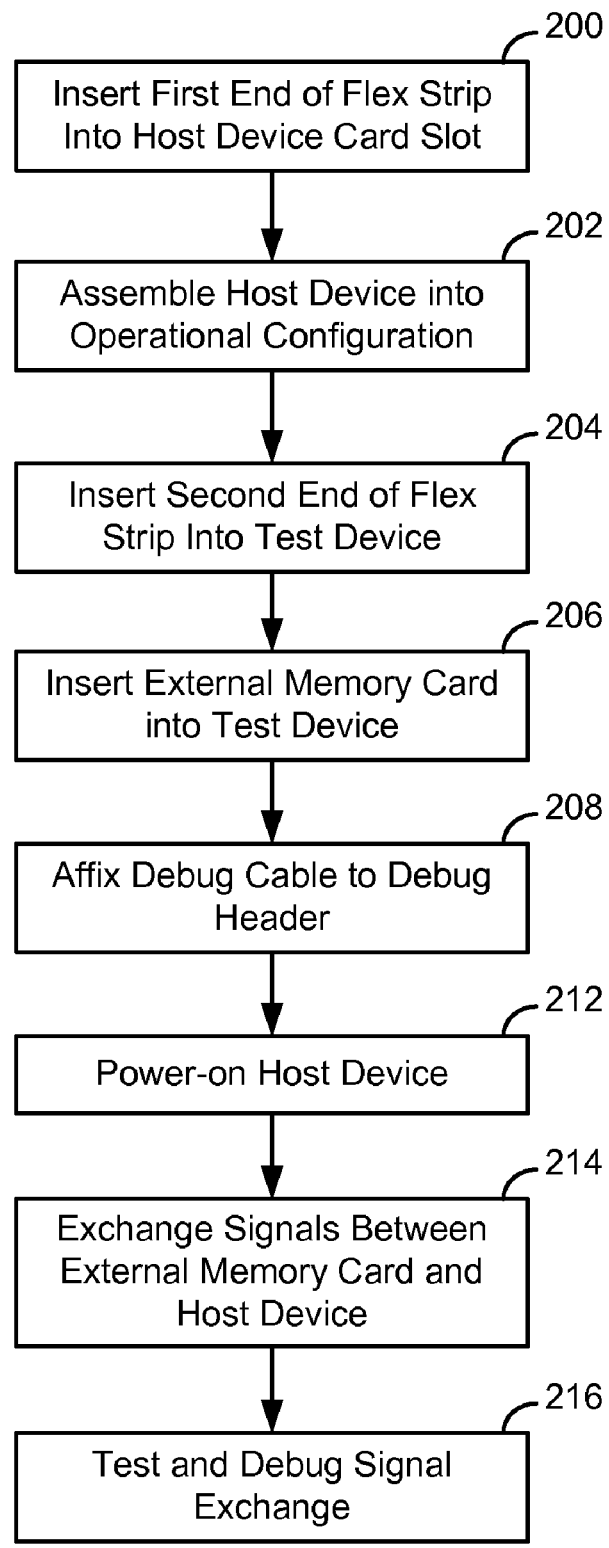
FIG. 7 is a flow chart of the assembly and operation of an embodiment of the present invention.

The operation of the present invention will now be described with reference to the flow chart of FIG. 7. In step 200, first end 112 of flex strip 110 is inserted into card slot 102 within host device 100. Cover 104 and any other components are removed as necessary to allow insertion of rigid member 124 in the card slot 102. In a step 202, host device 100 may be assembled into an operational configuration. This may include replacing a battery or other component over the internal card slot 102, and affixing the cover 104 in position on device 100.

In a step 204, second end 114 may be inserted into test assembly 132. An external memory card 140 may then be inserted into external card slot 134 in a step 206. In step 208, the debug cable 142 may be affixed to debug header 136. In alternative embodiments of the invention, step 208 may be skipped and no debug apparatus affixed to test assembly 132. In such embodiments, test assembly 132 and strip 110 may simply be used to test the exchange signals between an external memory card 140 and host device 100.

The device may be powered on in a step 212, and signals may be exchanged between the external memory card 140 and the host device 100 in a step 214. It is understood that the order of the above-described steps is not critical and may be performed in a different order in alternative embodiments. For example, step 212 of powering on the host device could be performed before step 204 of inserting the second end of flexible strip 110 into test assembly 132.

In step 216, strip 110 and test assembly 132 may be used to test and debug the signal exchange between host device 100 and the external memory card 140. Thus, according to the present invention, the operation of a memory card with the host device, and the exchange of signals between the host device and a memory card, may be tested and debugged even though the memory card slot is inaccessible while the host device is operational.

Figure 8:
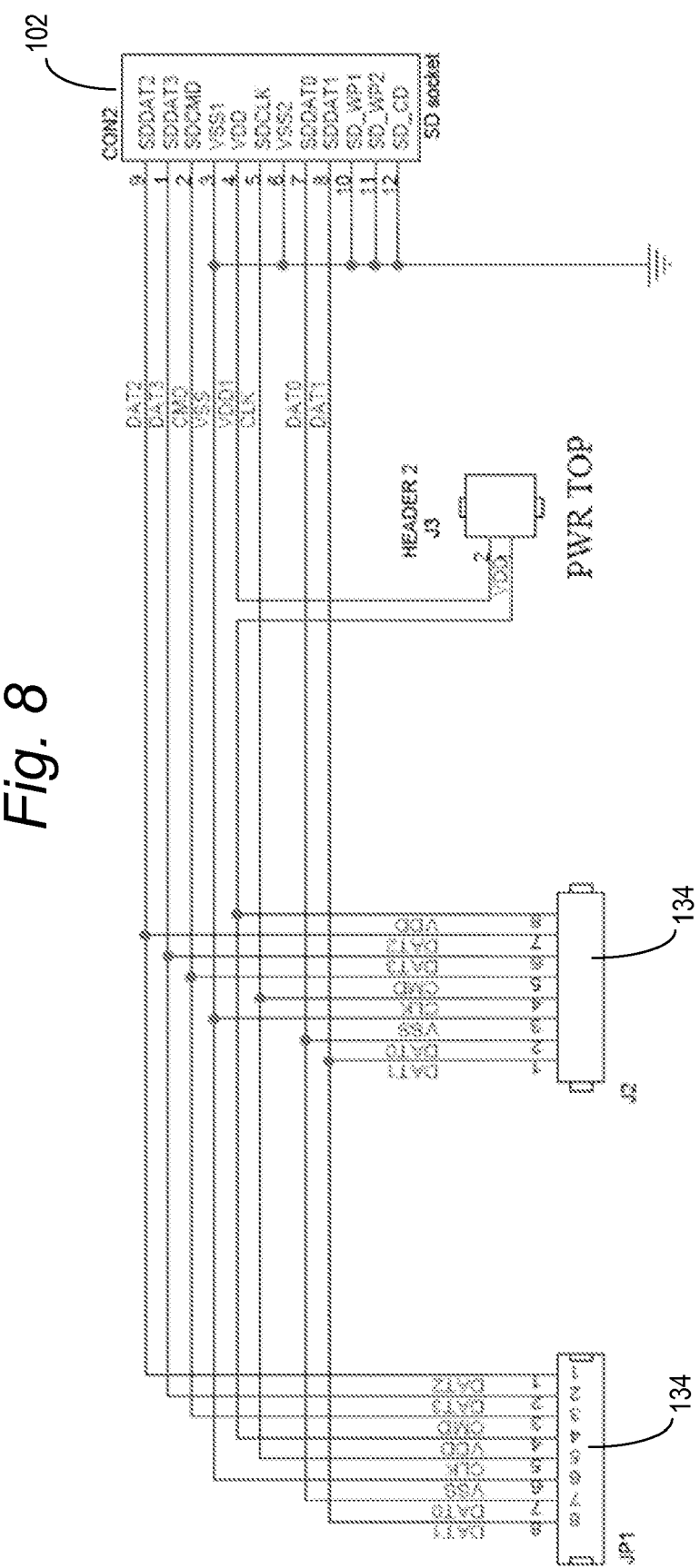
FIG. 8 is an electrical schematic diagram of test assembly according to the present invention.

Step 216 is explained in greater detail with respect to the schematic diagram of FIG. 8. Once all components are connected, signals may be exchanged between external memory card 140 and host device 100. Debug header 136 may extract signals sent from host device 100 to the external memory card. Those signals may be transferred to a debugging apparatus such as a logic analyzer and/or an oscilloscope. The debugging apparatus can then analyze the integrity of the respective signals transferred to and/or from device 100. The logic analyzer can access individual contact pads within the host device memory card slot 102, and can accordingly locate the source of a problem in the event the test detects a faulty signal exchange.

While embodiments of the present invention are particularly useful for testing the exchange of signals to and/or from a host device where the memory card slot is inaccessible, it is understood that the present invention may also be used with a card slot which is directly accessible from outside of the device. In such embodiments, the rigid member 124 on end 112 may be inserted directly into card slot 102 without having to remove cover 104 or any other components from host device 100.

While strip 110 and test assembly 132 have been described above as a system for testing the operation of a memory card with a host device, it is understood that strip 110 and assembly 132 may have other uses in further embodiments of the present invention. For example, in one such further embodiment, the above-described set up may be used to load software and/or data from an external memory card 140 onto host device 100. After the software and/or data are loaded, the above-described assembly may be used to test the exchange of signals between device 100 and external memory card 140. Alternatively, in this embodiment, the test procedure may be omitted and strip 110 and assembly 132 simply used to load software and/or information onto host device 100.

In the embodiments described above, rigid member 124 is used as a "dummy" memory card to facilitate the alignment and connection of first end 112 within card slot 102 in host device 100. In a further alternative embodiment, rigid member 124 may in fact be an operational memory card affixed to strip 110 and fitting within slot 102. In such an embodiment, flexible strip 110 may not be used to transfer electrical signals, but rather may be used as a support to facilitate automated insertion of the memory card into card slot 102 in device 100.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method of testing an exchange of signals between an electronic host device and a memory card capable of fifing within a socket in the electronic host device, the socket including contact pads for mating with contact pads on the memory card, the method comprising the steps of:
   (a) electrically coupling a first end of an electrical lead strip to the contact pads in the socket of the host device;
   (b) electrically coupling the second end of the electrical lead strip to a memory storage device external to the host device;
   (c) transferring signals at least from the host device to the external memory storage device; and
   (d) testing the signals transferred in said step (c).

2. A method of testing as recited in claim 1, further comprising the step (e) of mounting the first end of the electrical lead strip on a rigid member.

3. A method of testing as recited in claim 2, said step (e) of mounting the first end of the electrical lead strip on a rigid member comprising the step of mounting the first end of the electrical lead strip on a rigid member at least approximating the size and shape of the memory card fitting within the socket of the host device.

4. A method of testing as recited in claim 3, said step (a) of electrically coupling a first end of the electrical lead strip to the contact pads in the socket of the host device comprising the step of plugging the rigid member into the socket of the host device.

5. A method of testing as recited in claim 1, said step (b) of electrically coupling the second end of the electrical lead strip to an external storage device comprising the step of electrically coupling the second end of the electrical lead strip to an external memory card.

6. A method of testing as recited in claim 1, said step (b) of electrically coupling the second end of the electrical lead strip to an external storage device comprising the step of attaching the second end of the electrical lead strip to a test assembly and plugging the external memory storage device into the test assembly.

7. A method of testing as recited in claim 1, said step (d) of testing the signals comprising the step of extracting for analysis signals transmitted from the host device to the test assembly memory storage device.

8. A method of testing an exchange of signals between an electronic host device and a memory card capable of fifing within a socket in the electronic host device, the socket including contact pads for mating with contact pads on the memory card, the method comprising the steps of:
 (a) electrically coupling a first end of an electrical lead strip to the contact pads in the socket of the host device;
 (b) electrically coupling the second end of the electrical lead strip to a test assembly external to the host device;
 (c) supplying the test assembly with memory storage external to the host device;
 (d) transferring signals at least from the host device to the external memory storage; and
 (e) testing the signals transferred in said step (d).

9. A method of testing as recited in claim 8, said step (a) of electrically coupling the first end of the electrical lead strip to the contact pads in the socket of the host device comprising the steps of mounting the first end of the electrical lead strip to a rigid member approximating the shape of the memory card and inserting the rigid member into the socket.

10. A method of testing as recited in claim 9, said step (c) of supplying the test assembly with memory storage external to the host device comprising the step of building a memory storage device into the test assembly.

11. A method of testing as recited in claim 9, said step (c) of supplying the test assembly with memory storage external to the host device comprising the step of inserting an external memory card into the test assembly.

12. A method of testing as recited in claim 11, said step of inserting the external memory card into the test assembly comprising the step of inserting an external memory card which is the same configuration as the memory card fifing within the socket of the host device.

13. A method of testing as recited in claim 11, said step of inserting the external memory card into the test assembly comprising the step of inserting an external memory card which has a different configuration than the memory card fifing within the socket of the host device.

14. A method of testing as recited in claim 8, said step (e) of testing the signals comprising the step of extracting the signals and testing them with at least one of a logic analyzer and an oscilloscope.

15. In an electronic host device including a memory card mating with host device contact pads enclosed within the electronic host device, a method of testing the exchange of signals between the electronic host device and the memory card comprising the steps of:
 (a) forming a first end of an electrical lead strip with a rigid member having a shape at least approximating the memory card;
 (b) inserting the rigid member into the host device to mate electrical leads in the electrical lead strip with the contact pads enclosed within the host device;
 (c) coupling a second end of the electrical lead strip to a test assembly external to the host device;
 (d) affixing an external memory card into the test assembly;
 (e) transferring signals at least from the host device to the external memory card; and
 (f) testing the signals transferred in said step (d).

16. A method as recited in claim 15, said step (a) of forming a first end of an electrical lead strip with a rigid member having a shape at least approximating the memory card comprising the step of affixing the rigid member to the first end of the electrical lead strip using an adhesive.

17. A method as recited in claim 15, further comprising a step (g) of coupling a debugging device to the test assembly, the debugging device capable of accessing individual signals transferred to and from respective host device contact pads.

18. A method as recited in claim 17, said step (f) of testing the signals comprising the step (h) of using the debugging device coupled to the test assembly in said step (g).

19. A method of testing an exchange of signals between a mobile telephone and a memory card capable of fifing within a socket in the mobile telephone, the method comprising the steps of:
 (a) affixing a rigid member to an end of a flexible lead strip, the rigid member having a shape at least approximating the memory card;
 (b) inserting the rigid member into the host device socket;
 (c) coupling a second end of the flexible lead strip to a test assembly external to the cellular telephone;
 (d) supplying the test assembly with memory storage external to the cellular telephone;
 (e) transferring signals at least from the cellular telephone to the external memory storage; and
 (f) testing the signals transferred in said step (e).

20. A method of testing as recited in claim 19, wherein the memory card capable of fitting within the socket in the mobile phone is a micro SD memory card.

21. A method of testing as recited in claim 19, further comprising the step (g) of coupling a debugging device to the test assembly, the debugging device capable of accessing individual signals transferred to and from respective contact pads of the socket within the cellular telephone.

22. A method of testing as recited in claim 19, said step (f) of testing the signals comprising the step (h) of using the debugging device coupled to the test assembly in said step (g).

* * * * *

UNITED STATES PATENT AND TRADEMARK OFFICE
CERTIFICATE OF CORRECTION

PATENT NO. : 7,685,478 B2  Page 1 of 1
APPLICATION NO. : 11/693644
DATED : March 23, 2010
INVENTOR(S) : Chiou It is certified that error appears in the above-identified patent and that said Letters Patent is hereby corrected as shown below:

Col. 6, line 31: After "of" and before "within" delete "fifing" and substitute therefor --fitting--

Col. 8, line 26: After "of" and before "within" delete "fifing" and substitute therefor --fitting--

Signed and Sealed this

Thirteenth Day of July, 2010

David J. Kappos
*Director of the United States Patent and Trademark Office*